(12) United States Patent
Kondo

(10) Patent No.: US 11,114,880 B2
(45) Date of Patent: Sep. 7, 2021

(54) CURRENT REGULATING CIRCUIT AND POWER SUPPLY MANAGEMENT CIRCUIT INCLUDING THE SAME

(71) Applicant: ROHM CO., LTD., Ukyo-ku Kyoto (JP)

(72) Inventor: Kiyoshi Kondo, Ukyo-ku Kyoto (JP)

(73) Assignee: ROHM CO., LTD., Kyoto (JP)

( * ) Notice: Subject to any disclaimer, the term of this patent is extended or adjusted under 35 U.S.C. 154(b) by 464 days.

(21) Appl. No.: 16/004,733

(22) Filed: Jun. 11, 2018

(65) Prior Publication Data

US 2018/0358816 A1    Dec. 13, 2018

(30) Foreign Application Priority Data

Jun. 13, 2017  (JP) .............................. JP2017-115783

(51) Int. Cl.
*H02J 7/00* (2006.01)
*G05F 1/59* (2006.01)

(52) U.S. Cl.
CPC ................ *H02J 7/008* (2013.01); *G05F 1/59* (2013.01); *H02J 7/0068* (2013.01); *H02J 7/0072* (2013.01)

(58) Field of Classification Search
CPC ...................................................... G05F 1/618
See application file for complete search history.

(56) References Cited

U.S. PATENT DOCUMENTS

| | | | | |
|---|---|---|---|---|
| 7,482,788 B2 * | 1/2009 | Yang | ................ | H02M 3/1588 323/224 |
| 2004/0252434 A1 * | 12/2004 | Mori | .................. | H03K 17/0822 361/93.1 |
| 2006/0119320 A1 * | 6/2006 | Nork | ...................... | H02J 7/045 320/128 |
| 2006/0139002 A1 * | 6/2006 | Zemke | ................... | H02J 7/045 320/128 |
| 2007/0210756 A1 * | 9/2007 | Choi | ................... | H02J 7/00712 320/128 |

(Continued)

FOREIGN PATENT DOCUMENTS

| | | |
|---|---|---|
| JP | 2003028901 A | 1/2003 |
| JP | 2009213329 A | 9/2009 |

(Continued)

OTHER PUBLICATIONS

JPO Notice of Reasons for Refusal corresponding to JP Patent Application. No. 2017-115783 dated Mar. 19, 2021.

*Primary Examiner* — Drew A Dunn
*Assistant Examiner* — Tynese V McDaniel
(74) *Attorney, Agent, or Firm* — Cantor Colburn LLP

(57) ABSTRACT

There is provided a technique that includes: a first transistor used as an input, which is installed on a path through which a current to be regulated flows; a second transistor used as an output, which is connected to the first transistor to form a current mirror circuit; a resistor installed on a path of a current flowing through the second transistor; a stabilizing circuit configured to match an operating point of the second transistor with an operating point of the first transistor; and a transistor controller configured to regulate a voltage to be supplied to a control terminal of the first transistor according to a current detection signal that corresponds to a voltage drop across the resistor.

10 Claims, 9 Drawing Sheets

(56) References Cited

U.S. PATENT DOCUMENTS

| | | | | |
|---|---|---|---|---|
| 2010/0123521 A1* | 5/2010 | Bach | ................... | H03F 3/45179 |
| | | | | 330/278 |
| 2010/0301812 A1* | 12/2010 | Aiura | ..................... | H02J 7/008 |
| | | | | 320/160 |
| 2011/0057625 A1* | 3/2011 | Ashida | ................... | H02J 7/045 |
| | | | | 320/162 |
| 2014/0293664 A1* | 10/2014 | Dai | ................... | H03K 17/0412 |
| | | | | 363/44 |
| 2016/0352316 A1* | 12/2016 | Akama | ................... | G05F 1/565 |
| 2017/0104479 A1* | 4/2017 | Kanamori | .............. | H03K 17/14 |

FOREIGN PATENT DOCUMENTS

| | | |
|---|---|---|
| JP | 2010279177 A | 12/2010 |
| JP | 2016218639 A | 12/2016 |

* cited by examiner

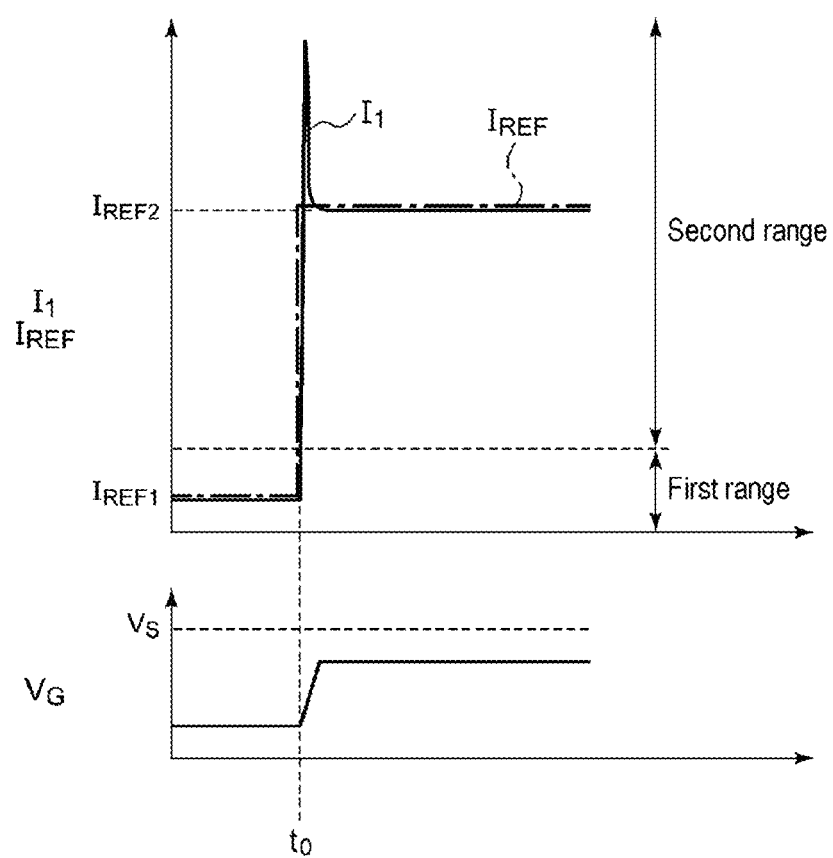

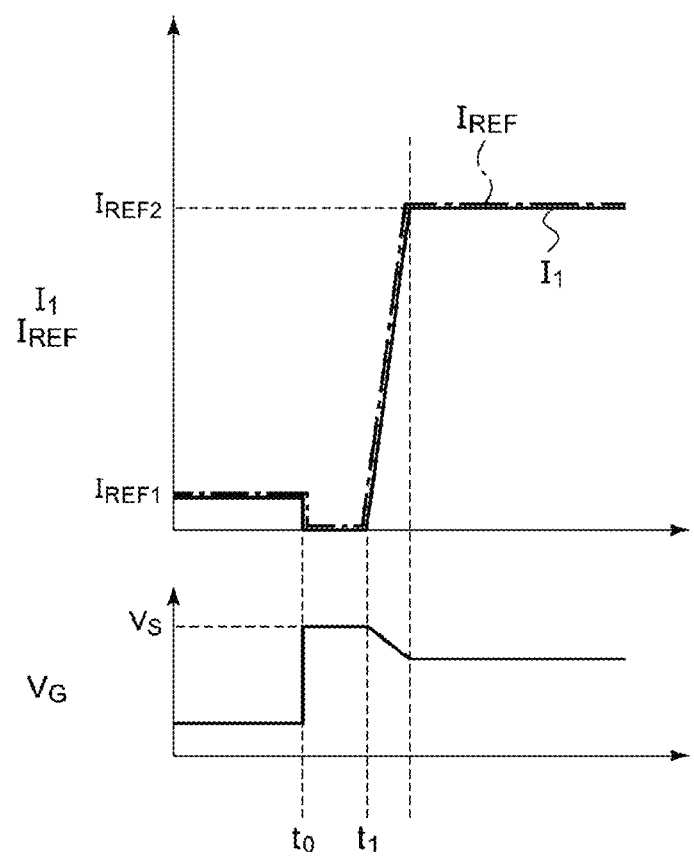

CURRENT REGULATING CIRCUIT AND POWER SUPPLY MANAGEMENT CIRCUIT INCLUDING THE SAME

CROSS-REFERENCE TO RELATED APPLICATION(S)

The present application claims priority under 35 U.S.C. § 119 to Japanese Patent Application No. 2017-115783, filed on Jun. 13, 2017, the entire contents of which are incorporated herein by reference.

TECHNICAL FIELD

The present disclosure relates to a current regulating circuit.

BACKGROUND

Sometimes it is desirable to stabilize a current flowing through a certain path to a target value or limit a current flowing through a certain path so as not to exceed a predetermined upper limit value. A constant current regulator or a current limiting circuit may be used to achieve such goal. In the present disclosure, a circuit having the function of regulating a current of a certain path is generally referred to as a current regulating circuit.

FIG. 1 is a circuit diagram of a current regulating circuit 100R that has been studied. The current regulating circuit 100R includes a main transistor 102, a current detecting circuit 110 and a transistor controller 130.

The main transistor 102 is installed on a path of a current $I_1$ to be regulated. The current detecting circuit 110 converts the current $I_1$ flowing through the main transistor 102 into a voltage. Specifically, the current detecting circuit 110 copies the current $I_1$ flowing through the main transistor 102 to a current $I_2$ and converts the copied current $I_2$ into the voltage. Together with the main transistor 102, a transistor 112 forms a current mirror circuit 114 while the main transistor 102 is for input of the current mirror circuit 114 and the transistor 112 is for output of current mirror circuit 114. That is, the gate and source of the transistor 112 are connected to the corresponding gate and source of the main transistor 102, respectively.

A resistor 116 is disposed on a path of the copied current $I_2$, and a voltage drop (current detection signal $V_{CS}$) proportional to the current $I_2$ is generated across the resistor 116. When the mirror ratio of the current mirror circuit 114 is K and the resistance of the resistor 116 is R, the current detection signal $V_{CS}$ can be expressed by the following equation.

$$V_{CS}=K \times R \times I_1$$

A stabilizing circuit 118 matches an operating point (a drain-source voltage, that is a voltage between a drain and a source of a transistor) $V_{DS}$ of the main transistor 102 with an operating point $V_{DS}$ of the transistor 112. Specifically, the stabilizing circuit 118 regulates a drain voltage $V_{D2}$ of the transistor 112 so as to be equal to a drain voltage $V_{D1}$ of the main transistor 102.

The transistor controller 130 regulates a gate voltage $V_G$ of the main transistor 102 based on the current detection signal $V_{CS}$. For example, if the regulating circuit 100R is a constant current circuit, the transistor controller 130 regulates the gate voltage $V_G$ such that the current detection signal $V_{CS}$ approaches a target voltage $V_{REF}$. If the current regulating circuit 100R is a current limiting circuit, the transistor controller 130 regulates the gate voltage $V_G$ such that the current detection signal $V_{CS}$ does not exceed an upper limit voltage $V_{LIM}$.

The current regulating circuit 100R of FIG. 1 has been studied and the following problems are found.

In order to reduce the loss caused by the main transistor 102, the on-resistance $R_{ON}$ of the main transistor 102 is required to be as small as possible (e.g., 1 or less). For example, if $R_{ON}$ is equal to 0.2Ω ($R_{ON}$=0.2Ω), the drain-source voltage of the main transistor 102 is 100 mV for the current $I_1$ of 500 mA (100 mV=0.2Ω×500 mA).

An error amplifier 120 of the stabilizing circuit 118 has an input offset voltage $V_{OFS}$ of the order of several mV. For example, if the offset voltage $V_{OFS}$ is 5 mV, the drain-source voltage (voltage drop) of the transistor 112 is stabilized to 100 mV±5 mV for the current $I_1$ of 500 mA. That is, due to the offset voltage $V_{OFS}$ of the error amplifier 120, an error of 5% may be introduced into the drain-source voltage of the main transistor 102 and the transistor 112.

It can be considered that the current regulating circuit 100R is applied to a wide current range. For example, if the current $I_1$ is reduced to 10 mA, the drain-source voltage of the main transistor 102 becomes 2 mV (=0.2Ω×10 mA). If the input offset voltage $V_{OFS}$ of the error amplifier 120 of the stabilizing circuit 118 is 5 mV, the drain-source voltage of the transistor 112 becomes 7 mV (=2 mV+5 mV), introducing an error of 250% (=(7 mV−2 mV)/2 mV×100).

As described above, in the current regulating circuit 100R of FIG. 1, the operating points (drain-source voltages) of the main transistor 102 and the transistor 112 do not match in a microcurrent region and accordingly the mirror ratio K of the current mirror circuit 114 is not constant. If the mirror ratio K is varied, since the current detection signal $V_{CS}$ expressed by $V_{CS}=K \times R \times I_1$ is not proportional to the current $I_1$, a current detection accuracy is lowered.

It should be noted that this problem, furthermore, the circuit configuration of FIG. 1, should not be recognized as a known technique.

SUMMARY

One of the exemplary purposes of some embodiments of the present disclosure is to provide a technique capable of operating over a wide current range.

According to one embodiment of the present disclosure, there is provided a technique that includes: a first transistor used as an input, which is installed on a path through which a current to be regulated flows; a second transistor used as an output, which is connected to the first transistor to form a current mirror circuit; a resistor installed on a path of a current flowing through the second transistor; a stabilizing circuit configured to match an operating point of the second transistor with an operating point of the first transistor; and a transistor controller configured to regulate a voltage to be supplied to a control terminal of the first transistor according to a current detection signal corresponding to a voltage drop across the resistor. The first transistor includes a plurality of transistor elements connected in parallel and at least one of the plurality of transistor elements is configured to be switchable between an effective mode and an ineffective mode. The each of the at least one of the plurality of transistor elements is controlled to be in the effective mode and the ineffective mode according to a range of the current to be regulated. According to this embodiment of the present disclosure, it is possible to switch the size of the first transistor, that is, the on-resistance of the first transistor, according to a current range. Thus, it is possible to narrow the fluctuation range of a voltage (voltage drop) across the second transistor and to provide a current regulating function over a wide current range.

When the range of the current to be regulated is switched, the transistor controller may turn off the plurality of transistor elements and then change the voltage of the control terminal of the first transistor. Thus, a current overshoot can be suppressed.

When the range of the current to be regulated is switched and a transistor element, among the at least one of the plurality of transistor elements, that has been in the ineffective mode is switched to the effective mode, the transistor controller may turn off the plurality of transistor elements and then change the voltage of the control terminal of the first transistor. Thus, a current overshoot can be suppressed.

According to other embodiment of the present disclosure, the current regulating circuit may further include a forced-off circuit installed separately from the transistor controller and configured to turn off the first transistor if the current detection signal exceeds a predetermined threshold value. Thus, the current can be limited even when a sharp load fluctuation occurs.

The forced-off circuit may include: a voltage comparator configured to compare the current detection signal with the predetermined threshold value and generate an off signal if the current detection signal exceeds the predetermined threshold value; and a third transistor installed between one end of the first transistor and the control terminal of the first transistor and configured to be turned on in response to the off signal.

According to another embodiment of the present disclosure, the current regulating circuit may be integrally integrated into one semiconductor chip. An immunity test may be performed without simultaneously turning on the plurality of transistor elements. An immunity test is performed in a semiconductor chip inspection process to check if there is no problem in function and safety even if a large current flows through transistors. When a large current exceeding an allowable value is applied to probes, the probes might be damaged. Therefore, the first transistor can be divided and tested by selectively conducting a plurality of transistor elements. As a result, the amount of current flowing at a time can be reduced to prevent the probes from being damaged.

According to another embodiment of the present disclosure, the current regulating circuit may be integrally integrated into one semiconductor chip. Pads PAD may be independently installed for the drains and sources of the transistor elements. An immunity test is performed in a semiconductor chip inspection process to check if there is no problem in function and safety even if a large current flows through transistors. When a large current exceeding an allowable value is applied to probes, the probes might be damaged. Therefore, independent pads are installed for each of the transistor elements and the amount of current flowing per pad can be reduced to prevent the probes from being damaged.

The transistor controller may be configured to regulate the voltage of the control terminal of the first transistor such that the current detection signal does not exceed a predetermined upper limit value.

The transistor controller may be configured to regulate the voltage of the control terminal of the first transistor such that the current detection signal approaches a predetermined target voltage.

The transistor controller may include: a fourth transistor installed between one end of the first transistor and the control terminal of the first transistor; and an error amplifier having a first input terminal configured to receive the current detection signal, a second input terminal configured to receive a reference voltage, and an output terminal connected to a control terminal of the fourth transistor.

According to another embodiment of the present disclosure, there is provided a power supply management circuit including: an input terminal configured to receive an external DC voltage; a system terminal; a battery terminal to which a battery is connected; and an input current limiting circuit configured to limit a current flowing from the input terminal to the system terminal. The input current limiting circuit includes the above-described current regulating circuit.

According to another embodiment of the present disclosure, there is provided a power supply management circuit including: an input terminal configured to receive an external DC voltage; a system terminal; a battery terminal to which a battery is connected; an input current limiting circuit configured to limit a current flowing from the input terminal to the system terminal, and a charging circuit configured to regulate a current flowing from the input terminal to the battery terminal. The charging circuit includes the above-described current regulating circuit. The input current limiting circuit includes the above-described current regulating circuit.

According to another embodiment of the present disclosure, there is provided a power supply management circuit including: an input terminal configured to receive an external DC voltage; a battery terminal to which a battery is connected; and a charging circuit configured to regulate a current flowing from the input terminal to the battery terminal. The charging circuit includes the above-described current regulating circuit.

Any combinations of the above-described elements or changes of the representations of the present disclosure between methods, apparatuses and systems are effective as embodiments of the present disclosure.

BRIEF DESCRIPTION OF THE DRAWINGS

FIG. 4A is a waveform diagram illustrating a case when a soft start operation is not performed. FIG. 4B is a waveform diagram for explaining the soft start operation.

DETAILED DESCRIPTION

Figure 1:
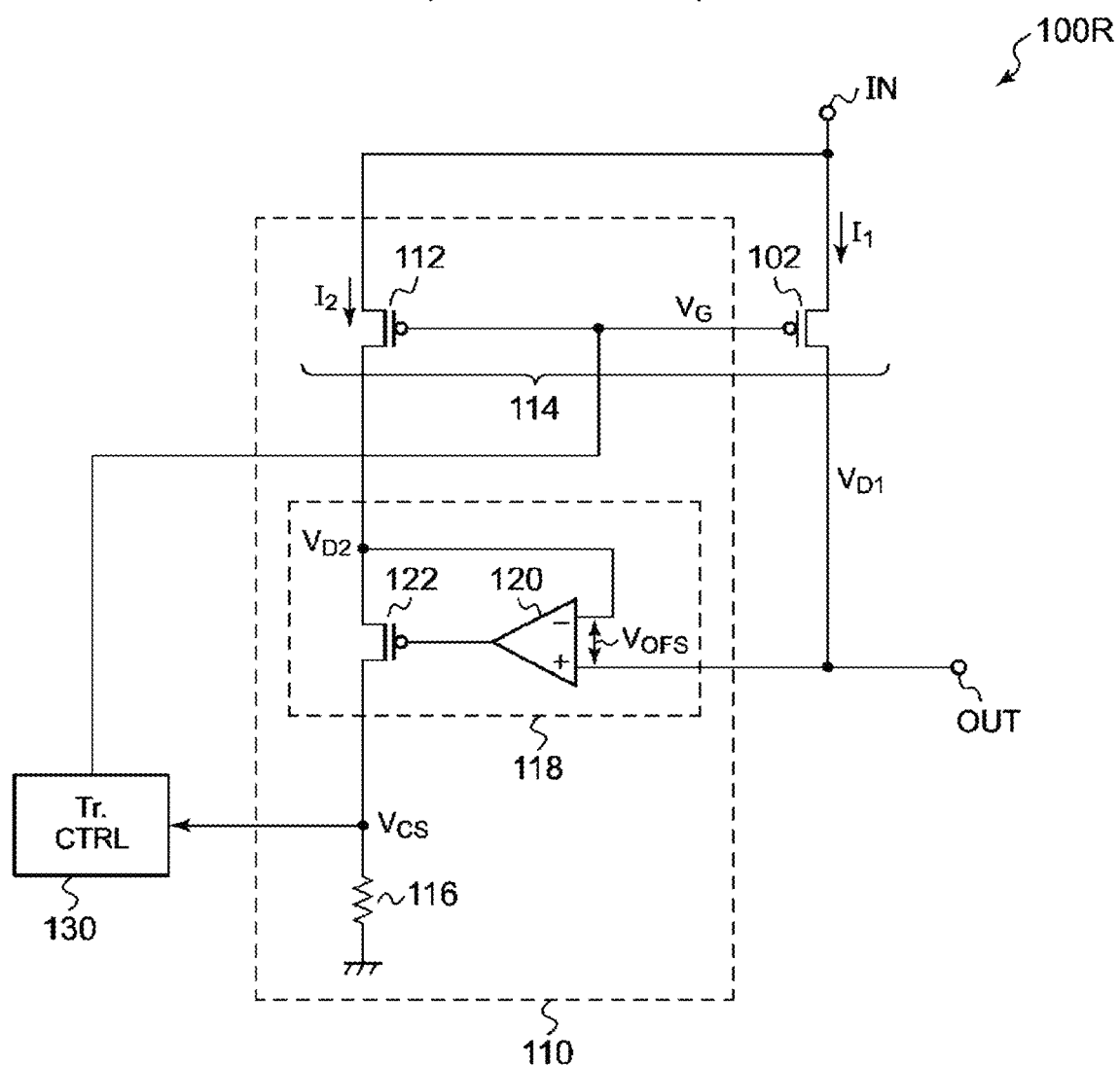
FIG. 1 is a circuit diagram of a current regulating circuit that has been studied.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the scope of the present disclosure, and any feature or combination of the features described in the embodiments may not necessarily be essential to the present disclosure.

In the present disclosure, "a state where a member A is connected to a member B" includes a case where the member A and the member B are physically and directly connected, or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 2:
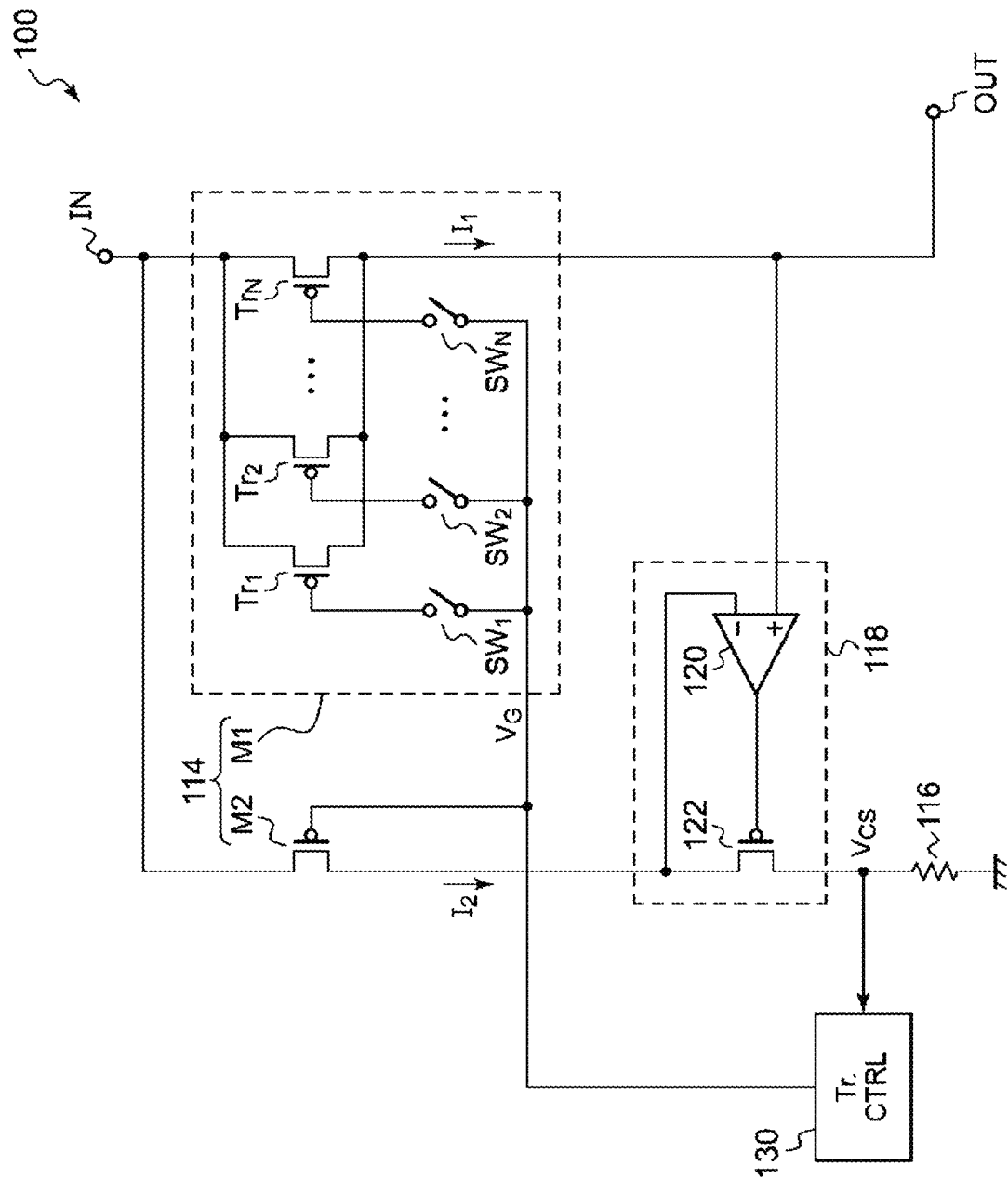
FIG. 2 is a circuit diagram of a current regulating circuit according to an embodiment of the present disclosure.

FIG. 2 is a circuit diagram of a current regulating circuit 100 according to an embodiment of the present disclosure. The current regulating circuit 100 regulates a current $I_1$ flowing from an input terminal (input node) IN to an output terminal (output node) OUT.

The current regulating circuit 100 includes a first transistor M1, a second transistor M2, a resistor 116, a stabilizing circuit 118 and a transistor controller 130. With reference to FIG. 2, the first transistor M1 and the second transistor M2 are indicated by the symbol of P channel FET (Field Effect Transistor), but without being limited to the FET, they may be indicated by the symbols of other transistors.

The first transistor M1 is installed on a path through which the current $I_1$ to be regulated flows. Specifically, the source of the first transistor M1 is connected to the input terminal IN, and the drain of the first transistor M1 is connected to the output terminal OUT.

The second transistor M2 is connected to the first transistor M1 to form a current mirror circuit 114 while the second transistor M2 is for output of the current mirror circuit 114 and the first transistor M1 is for input of the current mirror circuit 114. Specifically, the source of the second transistor M2 is connected to the source of the first transistor M1, that is, the input terminal IN, and the gate of the second transistor M2 is connected to the gate of the first transistor M1 in common.

The resistor 116 is installed on a path of a current $I_2$ flowing through the second transistor M2 and a voltage drop (current detection signal $V_{CS}$) proportional to the current $I_1$ is generated across the resistor 116. The current detection signal VCS can be expressed by the following equation.

$$V_{CS} = K \times R \times I_1$$

Where, K is the mirror ratio of the current mirror circuit 114.

The stabilizing circuit 118 matches an operating point of the second transistor M2 with an operating point of the first transistor M1. The stabilizing circuit 118 makes a drain voltage of the second transistor M2 approach a drain voltage of the first transistor M1. The stabilizing circuit 118 includes an error amplifier 120 and a transistor 122. The transistor 122 may be a P channel FET, and a source of the transistor 122 is connected to the drain of the second transistor M2 while a drain of the transistor 122 is connected to the resistor 116. The non-inverting input terminal (+) of the error amplifier 120 is connected to the drain of the first transistor M1 and the inverting input terminal (−) of the first transistor M1 is connected to the drain of the second transistor M2. The output of the error amplifier 120 is connected to the gate of the transistor 122. A gate voltage of the transistor 122 is regulated by the stabilizing circuit 118 such that an error between the drain voltage of the second transistor M2 and the drain voltage of the first transistor M1 approaches zero.

The transistor controller 130 regulates a control voltage (gate voltage) $V_G$ to be supplied to a control terminal (gate) of the first transistor M1 based on the current detection signal $V_{CS}$ corresponding to the voltage drop across the resistor 116. The function of the transistor controller 130 may be designed according to the function of the current regulating circuit 100.

In one embodiment of the present disclosure, the current regulating circuit 100 may be a current limiting circuit. In this embodiment, the transistor controller 130 regulates the voltage $V_G$ of the control terminal (gate) of the first transistor M1 such that the current detection signal $V_{CS}$ does not exceed a predetermined upper limit value $V_{LIM}$.

In another embodiment of the present disclosure, the current regulating circuit 100 may be a constant current regulator. In this embodiment, the transistor controller 130 regulates the voltage $V_G$ of the control terminal of the first transistor M1 such that the current detection signal $V_{CS}$ approaches a predetermined target voltage $V_{REF}$.

The first transistor M1 includes a plurality of N (N≥2) transistor elements (segments) $Tr_1$ to $Tr_N$ connected in parallel. At least one of the plurality of transistor elements $Tr_1$ to $Tr_N$ is configured to be switchable between an effective mode and an ineffective mode. A certain transistor element being in the effective mode means that the certain transistor is in a state in which an effective control voltage is supplied to the control terminal of the certain transistor, while a certain transistor element being in the ineffective mode means that the certain transistor is in a state in which an effective control voltage is not supplied to the control terminal of the certain transistor (in other words, a state of being fixed to OFF).

In the first transistor M1, each of the transistor elements $Tr_1$ to $Tr_N$ is controlled to be in the effective mode or the ineffective mode according to the range of the current $I_1$ to be regulated.

For example, the first transistor M1 may include a plurality of switches $SW_1$ to $SW_N$ installed between the output of the transistor controller 130 and the gates of the transistor elements $Tr_1$ to $Tr_N$. At least one transistor element (e.g., $Tr_1$) may always be in the effective mode, in which case a switch (e.g., $SW_1$) connected to the gate of the at least one transistor element (e.g., $Tr_1$) can be omitted.

If a transistor element Tr in the effective mode is switched, the mirror ratio K of the current mirror circuit 114 is varied. If M ranges of the current $I_1$ can be switched, the mirror ratio can be one of $K_1$ to $K_M$. Assuming that the mirror ratio of the i-th range of the current $I_1$ is $K_i$ (1≤i≤M), $V_{CS}$ can be expressed as follows.

$$V_{CS} = K_i \times R \times I_1$$

If the current regulating circuit 100 operates as a constant current regulator, a feedback is applied such that $V_{CS}$ approaches a reference voltage $V_{REF}$. Then, a target value $I_{REF}$ of the current $I_1$ can be expressed as follows.

$$I_{REF} = V_{REF}/(K_i \times R)$$

Therefore, by making at least one of the resistance R of the resistor 116 and the reference voltage $V_{REF}$ variable, the target value $I_{REF}$ of the current $I_1$ can be controlled.

If the current regulating circuit 100 operates as a current limiting circuit, a feedback is applied such that $V_{CS}$ does not exceed a reference voltage $V_{CURLIM}$. Then, an upper limit value $I_{CURLIM}$ of the current $I_1$ can be expressed as follows.

$$I_{CURLIM} = V_{CURLIM}/(K_i \times R)$$

Therefore, by making at least one of the resistance R of the resistor 116 and the reference voltage $V_{CURLIM}$ variable, the upper limit value $I_{CURLIM}$ of the current $I_1$ can be controlled.

The above is the basic configuration of the current regulating circuit 100. Hereinafter, the operation of the current regulating circuit 100 will be described.

For ease of understanding and simplification of explanation, specific numerical values are exemplified. N is equal to 2 and a rated current range is divided into N (=2) ranges. The rating of the current I1 is 5 mA to 500 mA, which is divided into a first range of 5 mA to 50 mA and a second range of 50 mA to 500 mA.

The transistor element $Tr_1$ is mainly used in the first range and the transistor element $Tr_2$ is mainly used in the second range. That is, the switch $SW_1$ is on and the switch $SW_2$ is off in the first range, and the switch $SW_2$ is on and the switch $SW_1$ is off in the second range.

The size (W/L) of the transistor element $Tr_1$ may be designed such that the drain-source voltage of the transistor element $Tr_1$ is higher than the offset voltage $V_{OFS}$ of the error amplifier 120 in the first range. Further, the size of the transistor element $Tr_2$ may be designed such that the drain-source voltage of the transistor element $Tr_2$ is higher than the offset voltage $V_{OFS}$ of the error amplifier 120 in the second range and the heat generation of the first transistor M does not become large.

In this embodiment, the on-resistance of the transistor element $Tr_1$ is 2Ω and the on-resistance of the transistor element $Tr_2$ is 0.2Ω. The on-resistance of the second transistor M2 is 400Ω.

Further, the offset voltage $V_{OFS}$ of the error amplifier 120 is set to 5 mV.

Subsequently, a description of the operation of the current regulating circuit 100 will be divided into a description of the first range and a description of the second range.

(1) First Range

If $I_1$=5 mA, the drain-source voltage of the transistor element $Tr_1$ (the first transistor M1) is 10 mV. Due to the influence of the offset voltage $V_{OFS}$=5 mV of the error amplifier 120, the drain-source voltage of the second transistor M2 is stabilized to 15 mV.

If $I_1$=50 mA, the drain-source voltage of the transistor element $Tr_1$ (the first transistor M1) is 100 mV. Due to the influence of the offset voltage $V_{OFS}$=5 mV of the error amplifier 120, the drain-source voltage of the second transistor M2 is stabilized to 105 mV.

(2) Second Range

If $I_1$=50 mA, the drain-source voltage of the transistor element $Tr_1$ (the first transistor M1) is 10 mV. Due to the influence of the offset voltage $V_{OFS}$=5 mV of the error amplifier 120, the drain-source voltage of the second transistor M2 is stabilized to 15 mV.

If $I_1$=500 mA, the drain-source voltage of the transistor element $Tr_1$ (the first transistor M1) is 100 mV. Due to the influence of the offset voltage $V_{OFS}$=5 mV of the error amplifier 120, the drain-source voltage of the second transistor M2 is stabilized to 105 mV.

The operation of the current regulating circuit 100 is set forth above.

Advantages of the current regulating circuit 100 are clear by comparing the current regulating circuit 100 with the current regulating circuit 100R of FIG. 1. Attention may be drawn to the operation in the first range when $I_1$ is equal to 5 mA ($I_1$=5 mA). In the current regulating circuit 100R of FIG. 1, at the same conditions, the drain-source voltage of the main transistor 102 is 2 mV, the drain-source voltage of the transistor 112 is 7 mV, and the error is 250%.

In contrast, in the case of the current regulating circuit 100 of FIG. 2, since the drain-source voltage of the first transistor M1 is 10 mV and the drain-source voltage of the second transistor M2 is 15 mV, the error due to the offset voltage $V_{OFS}$ is reduced to 50% (=(15 mV−10 mV)/10 mV×100). Therefore, even in the first range in which a microcurrent flows, a fluctuation in the mirror ratio of the current mirror circuit 114 can be suppressed. As a result, the current detection signal $V_{CS}$ is proportional to the current $I_1$ and can be generated in both the first range and the second range, thereby allowing accurate current detection.

If the offset voltage $V_{OFS}$ of the error amplifier 120 is further reduced, more accurate current detection becomes possible.

Hereinafter, a case where the current regulating circuit 100 is a constant current regulator will be described. However, the description below can be equally applied to a case where the current regulating circuit 100 is a current limiting circuit.

The scope of the present disclosure covers various devices and circuits grasped from the block diagram and circuit diagram of FIG. 2 or derived from the description above. However, the present disclosure is not limited to the disclosed particular configurations. Hereinafter, more specific embodiments and modifications will be described in order to aid the understanding of the nature and the circuit operations of the present disclosure and clarify them, rather than to narrow the scope of the present disclosure.

First Embodiment

Figure 3:
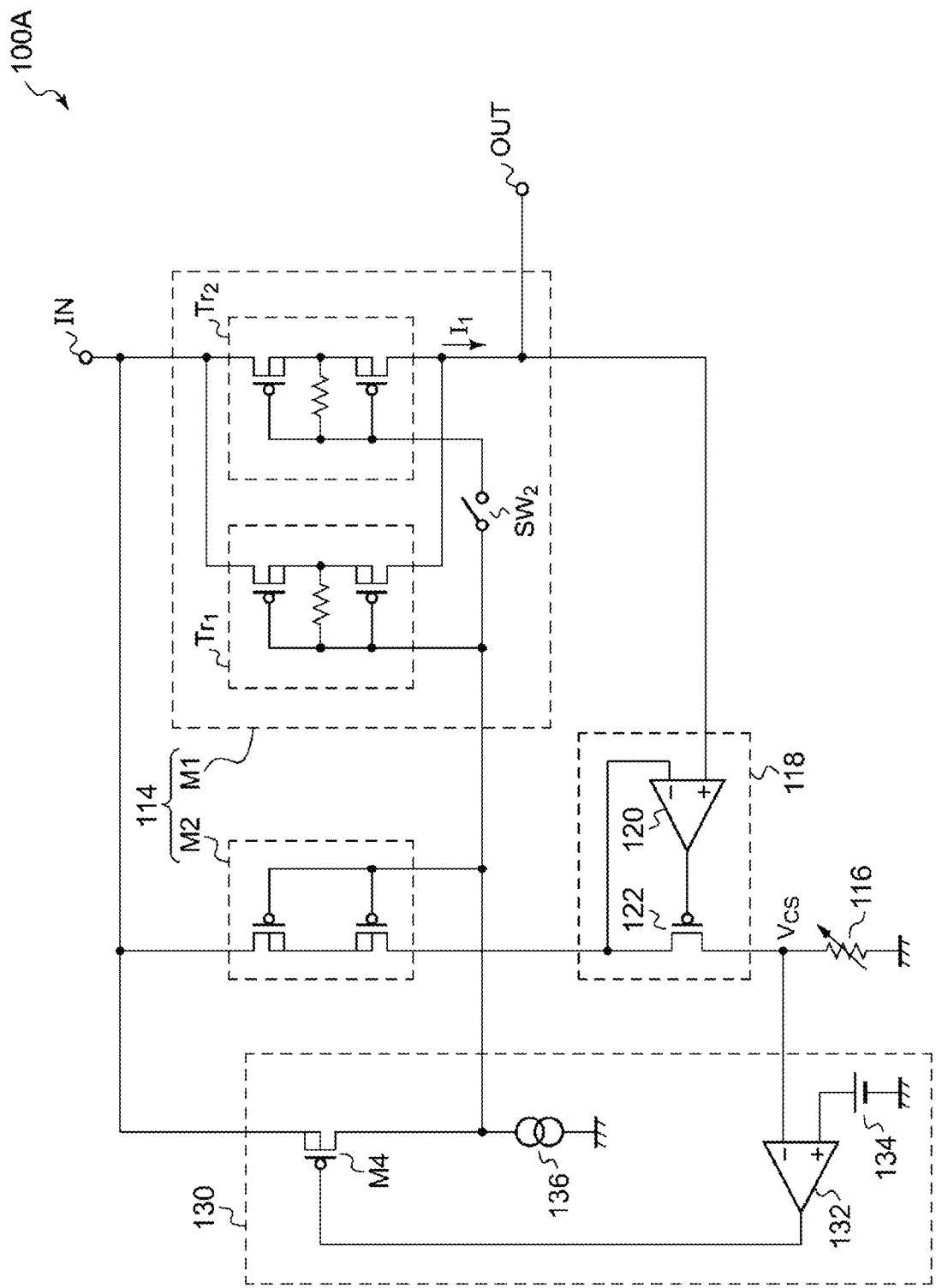
FIG. 3 is a circuit diagram of a current regulating circuit according to a first embodiment.

FIG. 3 is a circuit diagram of a current regulating circuit 100A according to a first embodiment. Each of transistor elements $Tr_1$, $Tr_2$ and a second transistor M2 includes two P channel FETs connected in series. The back gates of the two FETs are connected in common, and the body diodes of the two FETs are opposite each other.

In the first embodiment, only the transistor element $Tr_1$ is always in the effective mode and only the transistor element $Tr_2$ is switchable between the effective mode and the ineffective mode. Therefore, only the switch $SW_2$ is installed.

The transistor controller 130 includes a fourth transistor M4, an error amplifier 132, a reference voltage source 134 and a load circuit 136. The fourth transistor M4 is installed between one end (source) of a first transistor M1 and the control terminal (gate) of the first transistor M1. The load circuit 136 is installed between the control terminal (gate) of the first transistor M1 and ground. For example, the load circuit 136 is a current source, a resistor, a transistor or the like.

The error amplifier 132 has a first input terminal (−) configured to receive a current detection signal $V_{CS}$, a second input terminal (+) configured to receive a reference voltage $V_{REF}$, and an output terminal connected to the control terminal (gate) of the fourth transistor M4.

According to the configuration of the first embodiment, the gate voltage $V_G$ of the first transistor M1 can be regulated such that the current detection signal $V_{CS}$ approaches the reference voltage $V_{REF}$.

A current limiting circuit can also be configured similarly to the transistor controller 130 in FIG. 3. In the current limiting circuit, the operating points of the fourth transistor M4 and the error amplifier 132 may be determined such that the fourth transistor M4 is fully turned on in a region where the current $I_1$ is lower than an upper limit value $I_{CURLIM}$, and the gate-source voltage of the fourth transistor M4 is decreased in a region where the current $I_1$ exceeds the upper limit value $I_{CURLIM}$.

The resistor 116 is configured as a variable resistor and can control a target value $I_{REF}$ or the upper limit value $I_{CURLIM}$ of the current $I_1$ according to the resistance R of the resistor 116. In addition to or instead of configuring the resistor 116 as a variable resistor, the reference voltage source 134 may be configured as a variable voltage source.

The current regulating circuit 100 may have additional functions.

1. Soft Start Operation

When the range of the current $I_1$ to be regulated is switched, the transistor controller 130 turns off all of the transistor elements $Tr_1$ to $Tr_N$ first, and then changes the voltage $V_G$ of the control terminal of the first transistor M1 gradually. This may be referred to as a soft start operation.

FIG. 4A is a waveform diagram when the soft start operation is not performed. N can be set to 2 (N=2). Before the time point $t_0$, the current $I_1$ is stabilized to the target value $I_{REF1}$ of the first range. At the time point $t_0$, the current $I_1$ is switched to the target value $I_{REF2}$ of the second range. Along with the switching of the current $I_1$, the transistor element $Tr_2$ is newly switched to the effective mode. There is a delay before the transistor controller 130 stabilizes the gate voltage $V_G$ of the first transistor M1 to a voltage level to make $I_1$ equal to $I_{REF2}$, and this delay causes an overshoot in which the current $I_1$ greatly exceeds the target value $I_{REF2}$.

FIG. 4B is a waveform diagram for explaining the soft start operation. When the current $I_1$ starts to change to be switched to the target value $I_{REF2}$ of the second range at the time point $t_0$, all the transistor elements Tr of the first transistor M1 are turned off first. Specifically, the gate voltage $V_G$ of the first transistor M1 is raised to a source voltage $V_S$.

Then, after the time point $t_1$, the current $I_1$ is gradually increased from zero to the target value $I_{REF2}$. Since the gate voltage $V_G$ of the first transistor M1 decreases from the source voltage $V_S$, an overshoot can be suppressed.

The overshoot may not be a problem when decreasing a current. Therefore, when decreasing the current, it may not be necessary to perform the soft start operation. In a modification, at the time point of switching the current, when a new transistor element, which has not been selected until then, is selected, all the transistor elements are turned off first and then the voltage of the control terminal of at least one selected transistor element may be gradually changed.

Figure 5:
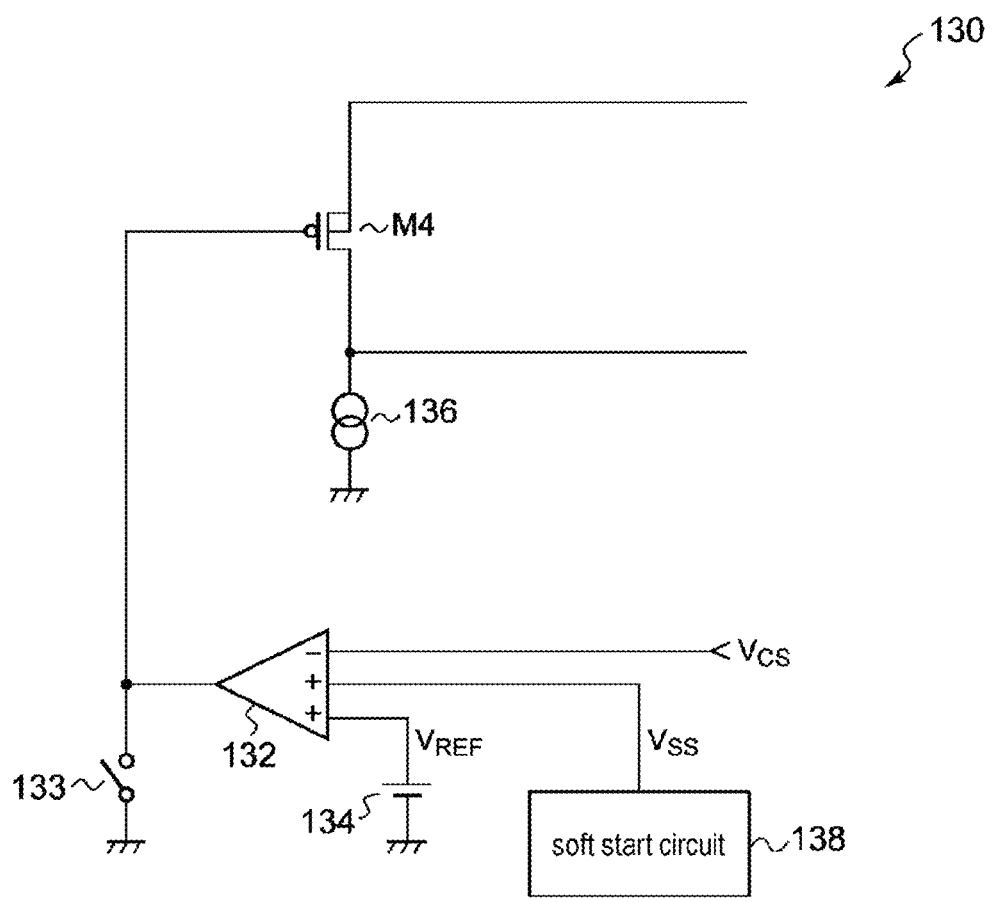
FIG. 5 is a circuit diagram illustrating a configuration example of a transistor controller that provides the soft start operation.

FIG. 5 is a circuit diagram illustrating a configuration example of the transistor controller 130 that provides the soft start operation. A pull-down switch 133 forcibly lowers the output of the error amplifier 132 to the ground voltage (0V) and turns on the fourth transistor M4 fully. The pull-down switch 133 is turned on during an off period between the time points $t_0$ and $t_1$ in FIG. 4B.

A soft start circuit 138 generates a soft start voltage $V_{SS}$ that gradually increases with time. The soft start voltage $V_{SS}$ increases from zero (0V) after the time point t1 in FIG. 4B.

The error amplifier 132 has two inverting input terminals (−) and amplifies an error between the current detection signal $V_{CS}$ and the lower of the soft start voltage $V_{SS}$ and the reference voltage $V_{REF}$. According to this configuration, the soft start operation of FIG. 4B can be performed.

Second Embodiment

Figure 6:
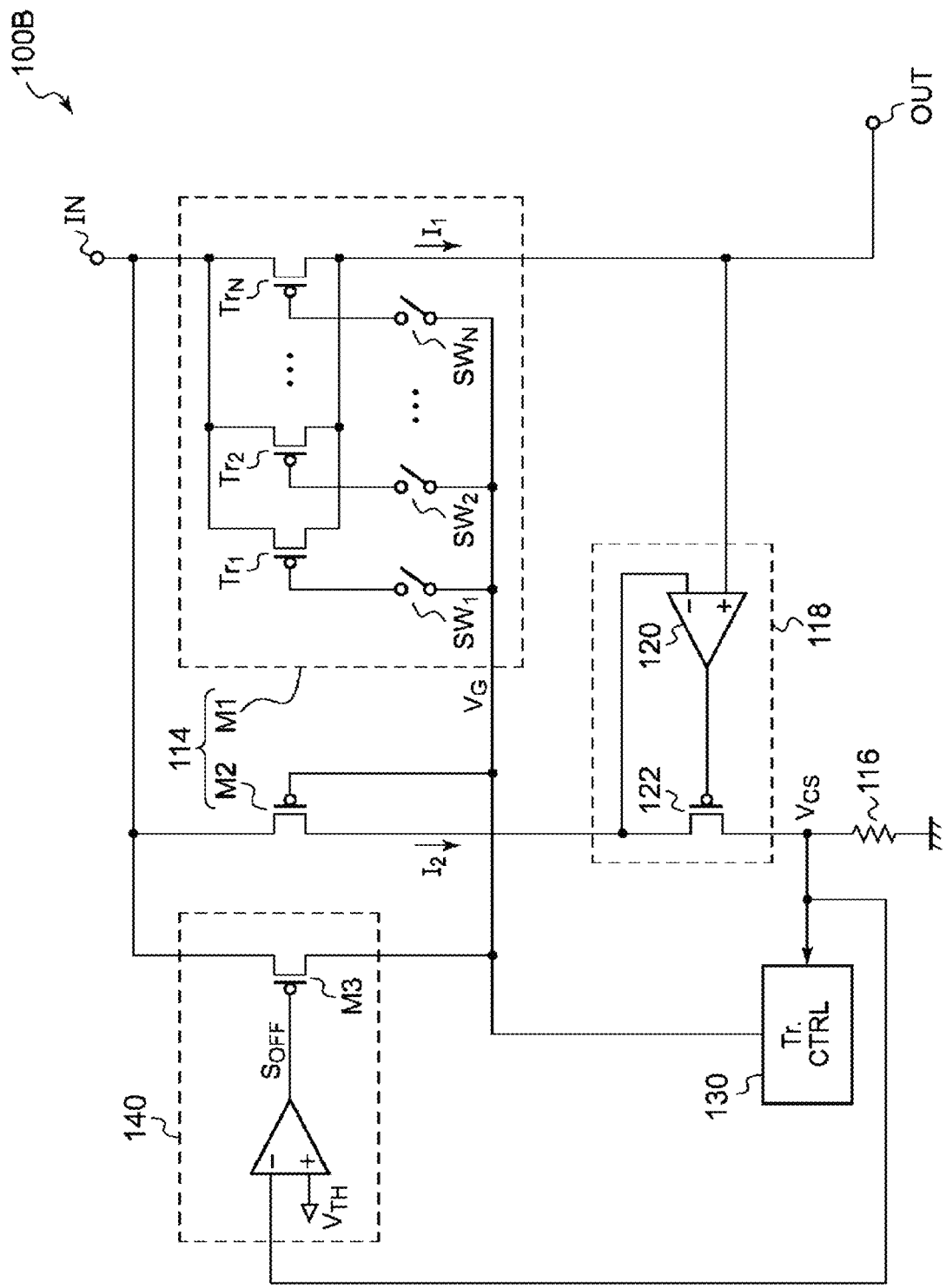
FIG. 6 is a circuit diagram of a current regulating circuit according to a second embodiment.

FIG. 6 is a circuit diagram of a current regulating circuit 100B according to a second embodiment. The current regulating circuit 100B has a second additional function. The current regulating circuit 100B includes a forced-off circuit 140 in addition to the current regulating circuit 100 of FIG. 2. The forced-off circuit 140 is installed separately from the transistor controller 130 and turns off the first transistor M1 if the current detection signal $V_{CS}$ exceeds a predetermined threshold value $V_{TH}$.

The forced-off circuit 140 includes a third transistor M3 and a voltage comparator 142. The voltage comparator 142 compares the current detection signal $V_{CS}$ with the threshold value $V_{TH}$ and generates an off signal $S_{OFF}$ for an assertion (e.g., a low level) if the current detection signal $V_{CS}$ exceeds the threshold value $V_{TH}$. The third transistor M3 is installed between one end (source) and the control terminal (gate) of the first transistor M1 and is turned on in response to the assertion of the off signal $S_{OFF}$.

The voltage comparator 142 may be configured with a differential amplifier or a simple comparator utilizing a gate-source threshold voltage of FET The forced-off circuit 140 is installed to prevent an overcurrent when a load fluctuation or an input voltage fluctuation faster than the response speed of the transistor controller 130 occurs.

Third Embodiment

Figure 7:
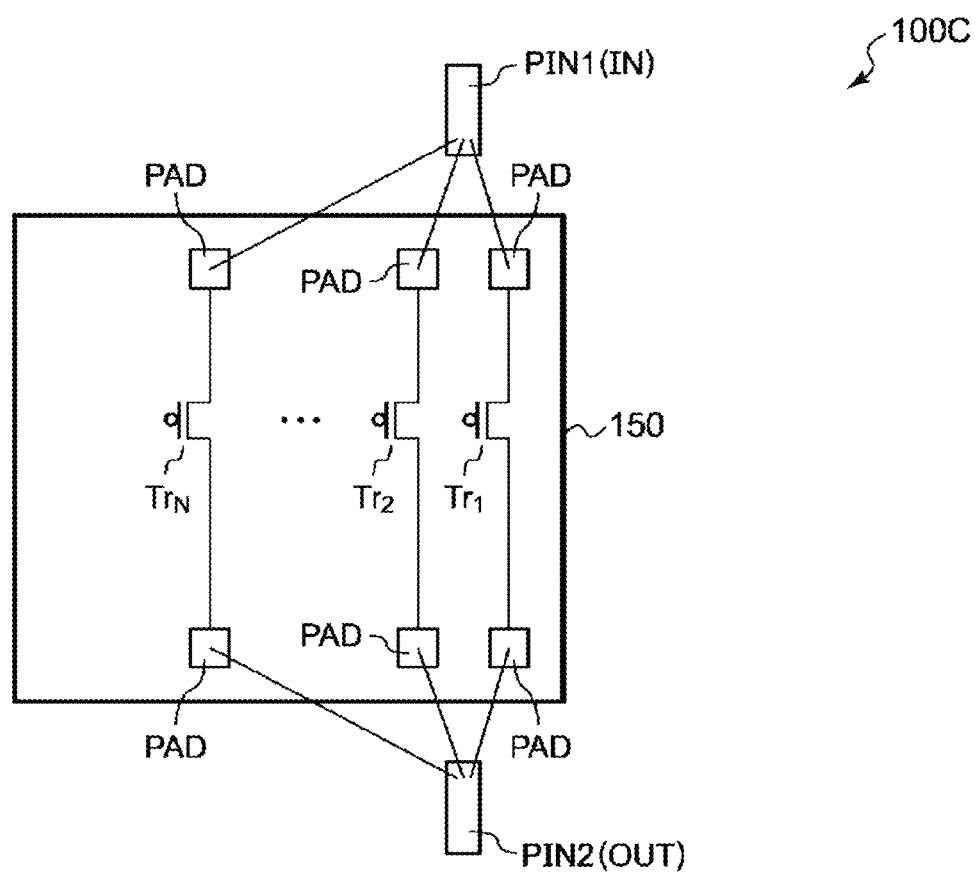
FIG. 7 is a view schematically illustrating a part of a current regulating circuit according to a third embodiment.

FIG. 7 is a view schematically illustrating a part of a current regulating circuit 100C according to a third embodiment. The current regulating circuit 100C is integrally integrated into one semiconductor chip (die) 150. Pads PAD are independently installed for the drains and sources of the transistor elements $Tr_1$ to $Tr_N$. The type of package of the current regulating circuit 100C is not particularly limited. The pads PAD on the drain side are electrically connected to a pin PIN1 corresponding to the input terminal IN, and the pads PAD on the source side are electrically connected to a pin PIN2 corresponding to the output terminal OUT Wire bonding or the like can be used for the connection, but not being limited thereto.

As typified by an ESD test, a lightning surge test and the like, various immunity tests are performed in an inspection process of a semiconductor chip 150 to check if there is a problem in function and safety even when a large current flows through the transistors M1 and M2. When a large current exceeding an allowable value is applied to probes, the probes might be damaged. Therefore, independent pads are installed for each of the transistor elements Tr and current may flow through each of the transistor elements Tr, whereby the amount of current flowing through each pad can be reduced to prevent the probes from being damaged.

Although it has been described that the pads PAD are installed for the respective transistor elements Tr, the present disclosure is not limited thereto. For example, a pad PAD may be shared by a plurality of the transistor elements Tr. Even in the case where the plurality of the transistor elements Tr share a pad PAD, the amount of current flowing in one test can be reduced to prevent the probes from being damaged, by controlling the switches $SW_1$ to $SW_N$ to selectively turn on the transistor elements Tr such that all of the transistor elements Tr are not turned on simultaneously.

In addition, the functions and configurations described in the first to third embodiments can be properly combined.

(Applications)

Figure 8:
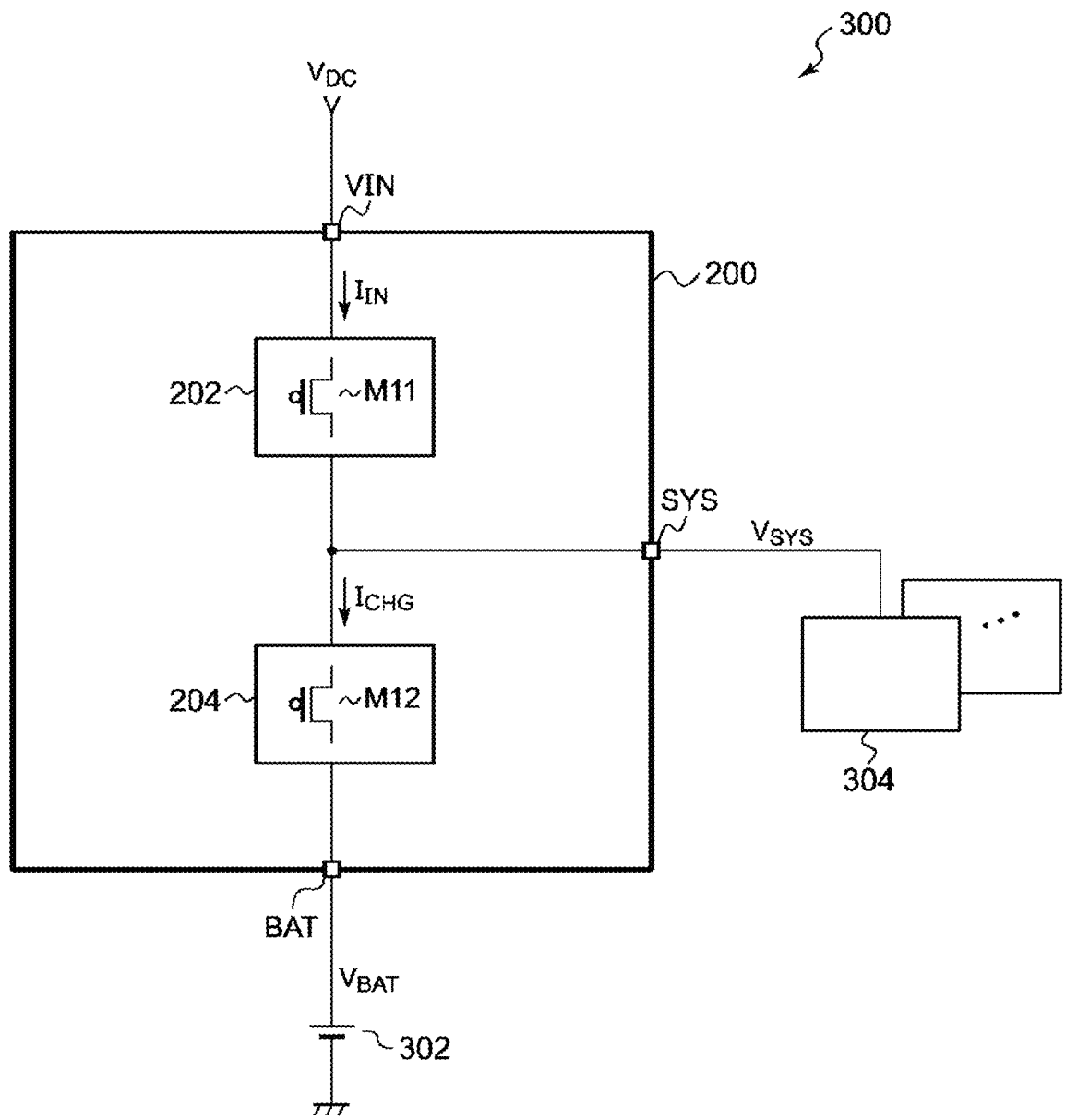
FIG. 8 is a block diagram of an electronic apparatus including a power supply management circuit.

Hereinafter, the applications of the current regulating circuit 100 will be described. The current regulating circuit 100 can be suitably used for a power supply management circuit 200. The power supply management circuit 200, which is also referred to as a PMIC (Power Management IC), is mounted on an electronic apparatus such as a smart phone, a tablet terminal, a digital camera, a computer or the like, and governs overall processing related to a power supply of the electronic apparatus. FIG. 8 is a block diagram of an electronic apparatus 300 including the power supply management circuit 200.

An external DC voltage $V_{DC}$ is supplied to an input terminal VIN of the power supply management circuit 200. The DC voltage $V_{DC}$ may be an output voltage of a power adapter or a bus voltage of a USB. Various circuit blocks 304 to which power is to be supplied are connected to a system terminal SYS. The circuit blocks 304 are DC/DC converters or the like.

A battery 302 is connected to a battery terminal BAT. If the DC voltage $V_{DC}$ is supplied to the input terminal VIN, the power supply management circuit 200 generates a system voltage $V_{SYS}$ based on the DC voltage $V_{DC}$ at the system terminal SYS, and supplies the system voltage $V_{SYS}$ to the circuit blocks 304. In addition, the power supply management circuit 200 charges the battery 302 using the DC voltage $V_{DC}$.

When the DC voltage $V_{DC}$ is not supplied, the power supply management circuit 200 generates the system voltage $V_{SYS}$ based on a battery voltage $V_{BAT}$ at the system terminal SYS and supplies the system voltage $V_{SYS}$ to the circuit blocks 304.

The power supply management circuit 200 includes an input current limiting circuit 202 installed between the input terminal VIN and the system terminal SYS and a charging circuit 204 installed between the system terminal SYS and the battery terminal BAT. The input current limiting circuit 202 includes a transistor M11 installed between the input terminal VIN and the system terminal SYS and limits an input current $I_{IN}$ not to exceed an upper limit value by controlling the degree of turning-on of the transistor M11. The architecture of the current regulating circuit 100 described above can be adopted for the input current limiting circuit 202. In this case, the transistor M11 corresponds to the first transistor M1 in FIG. 2.

The charging circuit 204 includes a transistor M12 installed between the SYS terminal and the BAT terminal and controls a charging current $I_{CHG}$ by controlling the degree of turning-on of the transistor M12. The architecture of the current regulating circuit 100 described above can also be adopted for the charging circuit 204. In this case, the transistor M12 corresponds to the first transistor M1 in FIG. 2.

The present disclosure has been described above by way of example. It should be understood by a skilled person in the art that various modifications to combinations of elements or processes may be made and such modifications fall within the scope of the present disclosure. Such modifications will be described below.

First Modification

The number of transistor elements Tr that belong to the first transistor M1 and the control of switching between the effective mode and the ineffective mode are not limited to embodiments described above. For example, the transistor elements $Tr_1$ to $Tr_N$ may be exclusively controlled such that only one transistor element is in the effective mode in a current range. Alternatively, the sizes (on-resistances) of the transistor elements $Tr_1$ to $Tr_N$ may be weighted with binary to make arbitrary transistor elements $Tr_1$ to $Tr_N$ be in the effective mode.

Second Modification

The configuration of the transistor controller 130 is not particularly limited to the embodiments described above, but may employ various feedback circuits well known in the art.

Third Modification

The transistors indicated as FETs in the figures may be configured with bipolar transistors. It is also effective to switch the P channel and the N channel in an arbitrary part and invert the top and bottom.

According to some embodiments of the present disclosure, it is possible to provide a current regulating circuit operable over a wide current range.

While certain embodiments have been described, these embodiments have been presented by way of example only, and are not intended to limit the scope of the present disclosure. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the present disclosure.

What is claimed is:
1. A current regulating circuit, comprising:
a first transistor used as an input, which is installed on a path through which a current to be regulated flows;
a second transistor used as an output, which is connected to the first transistor to form a current mirror circuit;
a resistor installed on a path of a current flowing through the second transistor;
a stabilizing circuit configured to match an operating point of the second transistor with an operating point of the first transistor;
a transistor controller configured to regulate a voltage to be supplied to a control terminal of the first transistor according to a current detection signal that corresponds to a voltage drop across the resistor; and
a forced-off circuit installed separately from the transistor controller and configured to turn off the first transistor if the current detection signal exceeds a predetermined threshold value,
wherein the first transistor includes a plurality of transistor elements connected in parallel and at least one of the plurality of transistor elements is configured to be switchable between an effective mode and an ineffective mode,
wherein each of the at least one of the plurality of transistor elements is controlled to be in the effective mode or the ineffective mode according to a range of the current to be regulated, and
wherein the forced-off circuit includes:
a voltage comparator configured to compare the current detection signal with the predetermined threshold value and generate an off signal if the current detection signal exceeds the predetermined threshold value; and a third transistor installed between one end of the first transistor and the control terminal of the first transistor and configured to be turned on in response to the off signal.

2. The current regulating circuit of claim 1, wherein when the range of the current to be regulated is switched, the plurality of transistor elements are turned off and then the voltage of the control terminal of the first transistor is changed.

3. The current regulating circuit of claim 1, wherein when the range of the current to be regulated is switched and a transistor element, among the at least one of the plurality of transistor elements, that has been in the ineffective mode is switched to the effective mode, the plurality of transistor elements are turned off and then the voltage of the control terminal of the first transistor is changed.

4. The current regulating circuit of claim 1, wherein the current regulating circuit is integrally integrated into one semiconductor chip, and
wherein an immunity test is performed without simultaneously turning on the plurality of transistor elements.

5. The current regulating circuit of claim 1, wherein the transistor controller is further configured to regulate the voltage of the control terminal of the first transistor such that the current detection signal does not exceed a predetermined upper limit value.

6. A power supply management circuit, comprising:
an input terminal configured to receive an external DC voltage;
a system terminal;
a battery terminal to which a battery is connected; and
an input current limiting circuit configured to limit a current flowing from the input terminal to the system terminal,
wherein the input current limiting circuit includes the current regulating circuit of claim 5.

7. The current regulating circuit of claim 1, wherein the transistor controller is further configured to regulate the voltage of the control terminal of the first transistor such that the current detection signal approaches a predetermined target voltage.

8. A power supply management circuit, comprising:
an input terminal configured to receive an external DC voltage;
a system terminal;
a battery terminal to which a battery is connected;
an input current limiting circuit configured to limit a current flowing from the input terminal to the system terminal; and
a charging circuit configured to regulate a current flowing from the input terminal to the battery terminal,
wherein the charging circuit includes the current regulating circuit of claim 7, and
wherein the input current limiting circuit includes a current regulating circuit including:
a first transistor used as an input, which is installed on a path through which a current to be regulated flows;

a second transistor used as an output, which is connected to the first transistor to form a current mirror circuit;
a resistor installed on a path of a current flowing through the second transistor;
a stabilizing circuit configured to match an operating point of the second transistor with an operating point of the first transistor;
a transistor controller configured to regulate a voltage to be supplied to a control terminal of the first transistor according to a current detection signal that corresponds to a voltage drop across the resistor; and
a forced-off circuit installed separately from the transistor controller and configured to turn off the first transistor if the current detection signal exceeds a predetermined threshold value,
wherein the first transistor includes a plurality of transistor elements connected in parallel and at least one of the plurality of transistor elements is configured to be switchable between an effective mode and an ineffective mode,
wherein each of the at least one of the plurality of transistor elements is controlled to be in the effective mode or the ineffective mode according to a range of the current to be regulated, and
wherein the forced-off circuit includes:
a voltage comparator configured to compare the current detection signal with the predetermined threshold value and generate an off signal if the current detection signal exceeds the predetermined threshold value; and
a third transistor installed between one end of the first transistor and the control terminal of the first transistor and configured to be turned on in response to the off signal, and
wherein the transistor controller is further configured to regulate the voltage of the control terminal of the first transistor such that the current detection signal does not exceed a predetermined upper limit value.

9. A power supply management circuit, comprising:
an input terminal configured to receive an external DC voltage;
a battery terminal to which a battery is connected; and
a charging circuit configured to regulate a current flowing from the input terminal to the battery terminal,
wherein the charging circuit includes the current regulating circuit of claim 7.

10. The current regulating circuit of claim 1, wherein the transistor controller includes:
a fourth transistor installed between one end of the first transistor and the control terminal of the first transistor; and
an error amplifier having a first input terminal configured to receive the current detection signal, a second input terminal configured to receive a reference voltage, and an output terminal connected to a control terminal of the fourth transistor.

* * * * *